(No Model.) 2 Sheets—Sheet 2.

H. BRYAN.
HEADER ATTACHMENT FOR HARVESTERS.

No. 387,763. Patented Aug. 14, 1888.

Witnesses,
Geo. H. Strong.
J. H. Krouse

Inventor,
Henry Bryan.
By Dewey & Co.
Atty

UNITED STATES PATENT OFFICE.

HENRY BRYAN, OF MODESTO, CALIFORNIA.

HEADER ATTACHMENT FOR HARVESTERS.

SPECIFICATION forming part of Letters Patent No. 387,763, dated August 14, 1888.

Application filed December 1, 1887. Serial No. 256,721. (No model.)

*To all whom it may concern:*

Be it known that I, HENRY BRYAN, of Modesto, Stanislaus county, State of California, have invented a Header Attachment for Harvesters; and I hereby declare the following to be a full, clear, and exact description of the same.

My invention relates to a header attachment for harvesters.

It consists of a header-frame having one side provided with a pivot-pin, which allows of a rocking motion in the line of travel, said pin being hinged to the side of the thrasher-machine frame near the front, so that the outer side of the header-frame may be raised and depressed about the hinged joint, a supplemental diagonally-placed brace-bar having its outer end provided with an angular casting pivoted to the main header-frame in alignment with the first-named pin, by which the header-frame is connected with the thrasher-frame, the rear end of said bar being hinged to the side of the thrasher-frame near the rear end, a wheel by which the outer side of the header-frame is supported, said wheel being journaled in a frame which is pivoted to the thrasher-frame so as to turn about a vertical pivot-pin, and in connection with the header-frame of a truss-frame and adjustable rods, all of which will be more fully explained by reference to the accompanying drawings, in which—

Figure 1:
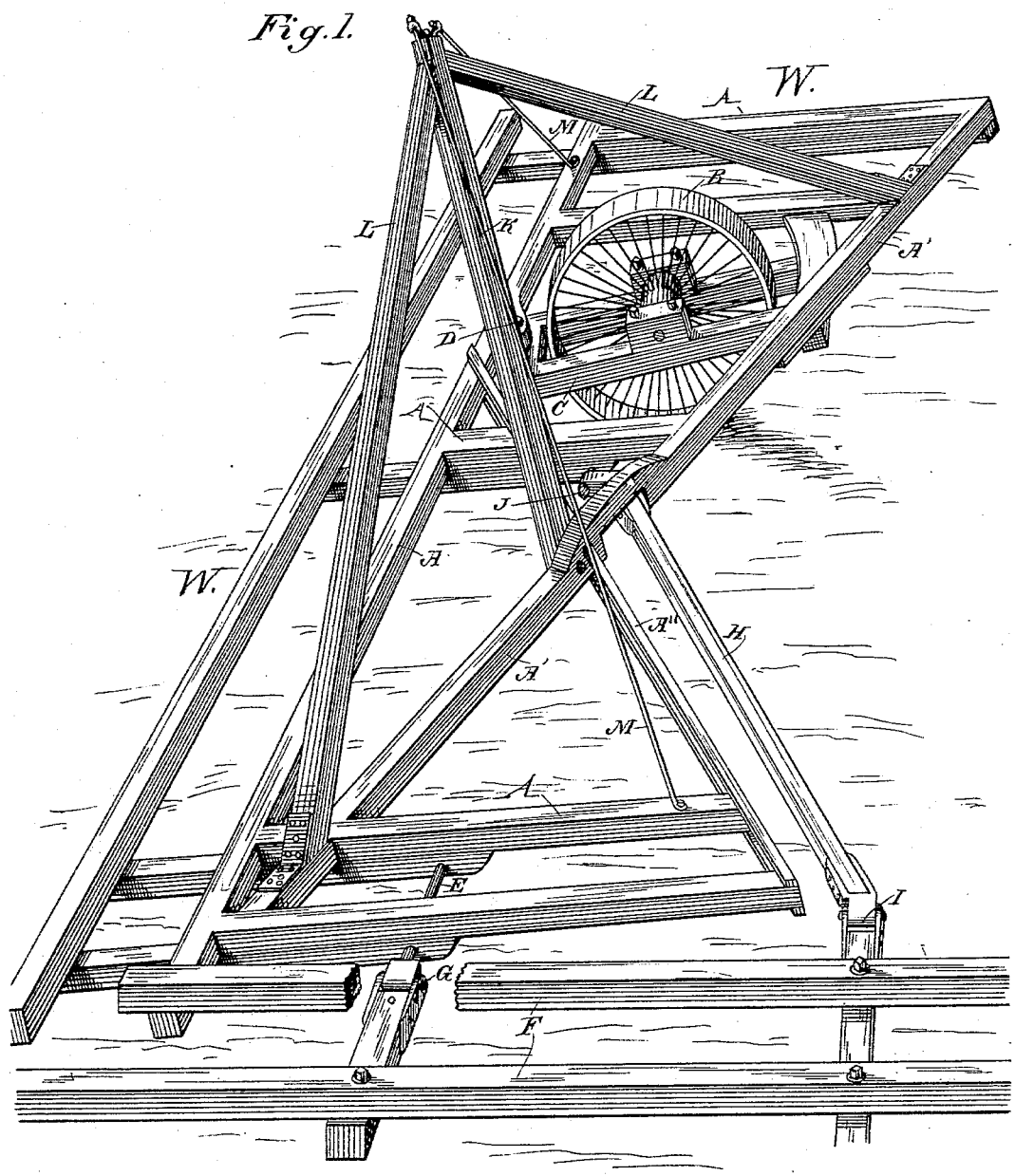
Figure 2:
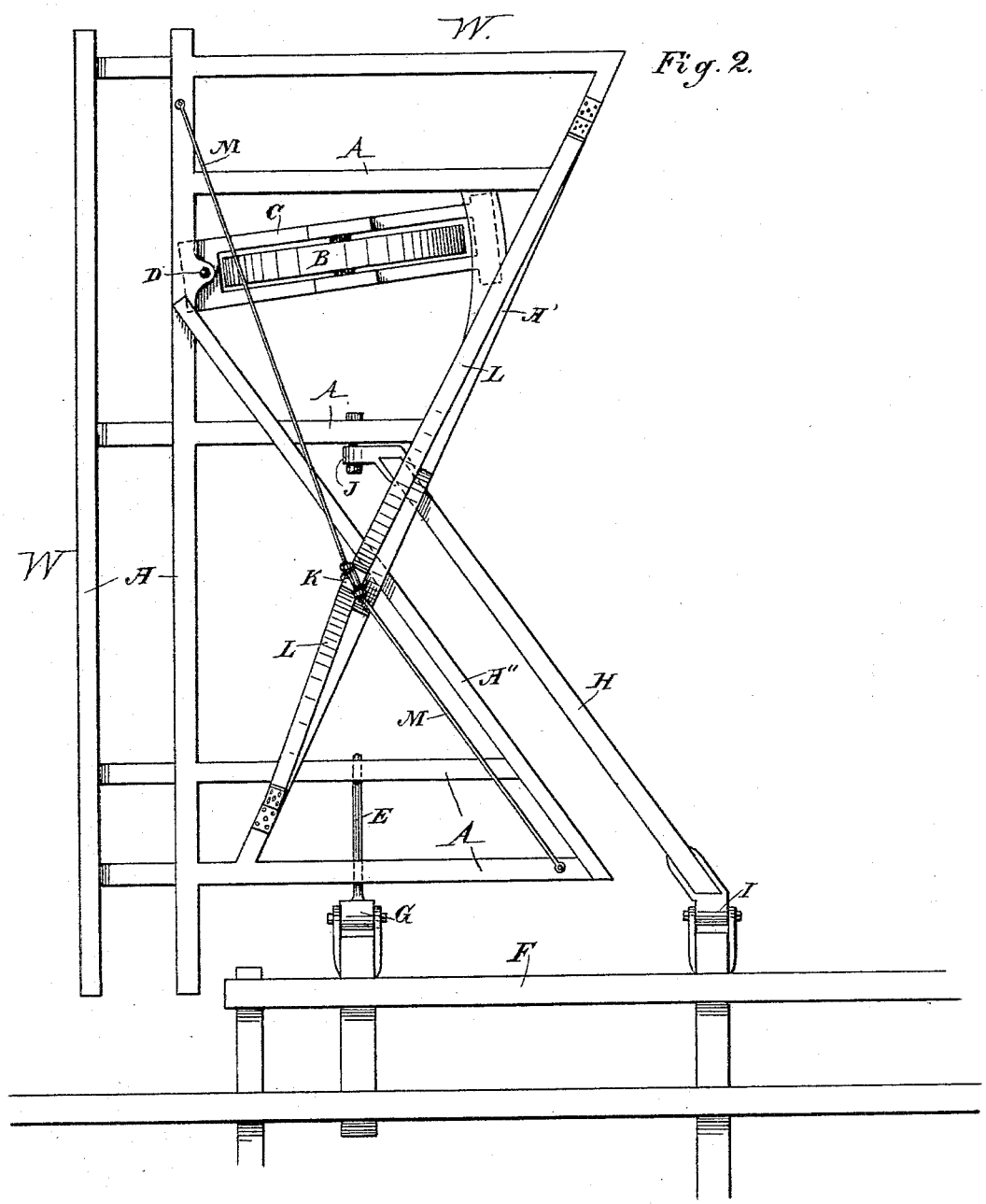

Figure 1 is a general perspective view showing the side of the thrashing-machine frame, the header-frame, and its attachments. Fig. 2 is a plan view of the same.

The header-frame W is composed of the timbers A, secured together at right angles with each other, the diagonal timber A″, and a bracing-timber, A′, which extends diagonally across from the front of the side nearest the thrasher-frame to the rear of the outer side of the header-frame, being secured to the timbers A so as to act as a brace and prevent the header-frame from twisting or getting out of shape in the horizontal plane.

The side of the header-frame W nearest to the thrashing-machine frame F is connected therewith by a pivot-pin, E, around which the header-frame may rock in the direction of the line of travel. This pin has a hinged joint, G, upon its inner end, which is connected with the side of the thrashing-machine frame near the front, and this hinge-joint allows the outer side of the header-frame to be raised and depressed with relation to the thrashing-machine frame.

The outer side of the header-frame is supported upon a wheel, B, which is journaled in the independent frame C. This frame has its front end connected with the header-frame by the vertical pin D, which allows the rear end of the frame C to swing to one side or the other when the machine is turned in passing around corners. That portion of the header-frame which is above the rear end of the frame C rests upon frame C and has a curved track beneath which the frame C may move from side to side. When the wheel B stands in a line with the direction of travel, its shaft or axis is nearly or quite in line with the pivot-pin E.

The pivot-pin E has not sufficient rigidity to prevent the outer side of the header-frame from swinging backward when the machine is drawn along over the ground and at work, and in order to brace it and hold it in a proper position I employ a bar, H, the inner end of which has an angular casting which has a hinge, I, connecting it to the side of the thrashing-machine frame near the rear end. This bar H extends in a diagonal direction from the hinge I forward and outward, and has upon its outer end an angular casting which is bent at such an angle with the diagonal bar that it extends parallel with the middle fore and aft timber or beam of the header-frame W, and is pivoted thereto by a pin, J, in line with the pin E, and approximately in line with the shaft of the wheel B. This allows the header-frame to rock about these points of support in the direction of the travel of the machine, so as to raise and depress the front end of the frame to adapt the sickle to high or low grain.

By reason of the diagonal position of the timber A′ and the bar H the header-frame is much narrower from front to rear near the center than it is at the two sides, and for this reason it is difficult to frame the timbers A and A′ together with sufficient strength to prevent the vertical twisting of the frame as it passes over irregular ground, and a tendency of one portion or the other to sag out of line. To overcome this and to enable me to adjust the header-frame in case it should get out of line, I employ an upright post, K, which is preferably bolted to the diagonal timber or beam A' near the center. Brace-timbers L extend from the upper part of the post K to the ends of the diagonal timber A', and these will prevent the center of the header-frame from sagging, while the truss-rods M, which extend from the top of the post to the remaining two corners of the header-frame prevent the sagging of these outer corners. These truss-rods are connected with the upright post either by being screw-threaded and having nuts by which they may be adjusted, or by any suitable well-known form of adjustment. By means of these rods any tendency to sag in the ends of the header-frame may be counteracted at any time.

Having thus described my invention, what I claim as new, and desire to secure by Letters Patent, is—

1. A thrashing frame having a horizontal pin, E, extending outwardly from the front of the side adjacent to the header-frame, said pin being hinged to the thrashing-machine frame, so as to have a vertical movement on the hinge G, a header-frame pivoted upon this pin so as to have a rocking movement about it in the direction of the line of travel of the machine, and a wheel, B, by which the outer side of the header-frame is supported, the shaft of said wheel being journaled approximately in line with the pivot-pin E, in combination with the diagonal bar H, having one end hinged to the side of the thrashing-machine frame near the rear on a line with the hinge G, and the other end pivoted to the header-frame near the center and in line with the pin E, substantially as and for the purpose herein described.

2. In a combined header and thrasher, a header-frame consisting of the timbers A, secured together at right angles with each other, the diagonal timber A'', and the bracing-timber A', extending diagonally across from the front of the side nearest the thrasher-frame to the rear of the outer side of the header-frame, the hinged pivot-pin E, by which the header-frame is connected with the side of the thrashing-machine frame, the wheel B, by which the outer side of the header-frame is supported, the diagonal brace-bar H, pivoted to the header-frame near its center and in line with the pivot-pin E, and hinged to the side of the thrashing-machine frame near the rear end and in line with the hinge G, in combination with the upright post K, the brace-timbers L, extending from the upper end of the post to the outer ends of the diagonal timber A', and the rods M, extending from the upper end of the post to the remaining two corners of the header-frame, substantially as and for the purpose described.

In witness whereof I have hereunto set my hand.

HENRY BRYAN.

Witnesses:
S. H. NOURSE,
H. C. LEE.